United States Patent
Yang et al.

(10) Patent No.: US 8,513,895 B2
(45) Date of Patent: Aug. 20, 2013

(54) HIGH EFFICIENCY LED DRIVER WITH CURRENT SOURCE REGULATIONS

(75) Inventors: Ta-Yung Yang, Milpitas, CA (US); Byung-Hak Ahn, Seoul (KR); Jin-Hwa Chung, Seoul (KR); Chun-Chi Chen, Taipei County (TW)

(73) Assignee: System General Corp., New Taipei (TW)

( * ) Notice: Subject to any disclaimer, the term of this patent is extended or adjusted under 35 U.S.C. 154(b) by 699 days.

(21) Appl. No.: 12/762,386

(22) Filed: Apr. 19, 2010

(65) Prior Publication Data

US 2011/0080109 A1 Apr. 7, 2011

Related U.S. Application Data

(60) Provisional application No. 61/278,070, filed on Oct. 1, 2009.

(51) Int. Cl.
*H05B 37/02* (2006.01)
(52) U.S. Cl.
USPC .................. 315/291; 315/307; 315/308
(58) Field of Classification Search
USPC .............. 315/291, 297, 300, 307, 308, 299
See application file for complete search history.

(56) References Cited

U.S. PATENT DOCUMENTS

| 8,040,079 B2* | 10/2011 | Zhao | 315/299 |
| 8,169,159 B2* | 5/2012 | Lu et al. | 315/307 |
| 2008/0116818 A1* | 5/2008 | Shteynberg et al. | 315/192 |
| 2008/0129220 A1* | 6/2008 | Shteynberg et al. | 315/291 |
| 2009/0102399 A1* | 4/2009 | Kita | 315/307 |

FOREIGN PATENT DOCUMENTS

CN 101521967 9/2009

OTHER PUBLICATIONS

"First Office Action of China counterpart application" issued on Aug. 16, 2012, p. 1-p. 8.

* cited by examiner

*Primary Examiner* — Jimmy Vu
*Assistant Examiner* — Henry Luong
(74) *Attorney, Agent, or Firm* — Jianq Chyun IP Office (57) ABSTRACT

The present invention provides a control circuit for LED driver. A voltage-feedback circuit is coupled to LEDs to sense a voltage-feedback signal for generating a voltage loop signal. Current sources are coupled to the LEDs to control LED currents. A detection circuit is connected to sense voltages of current sources for generating a current-source loop signal in response to a minimum voltage of the current sources. Furthermore, a buffer circuit generates a feedback signal in accordance with the voltage loop signal and the current-source loop signal. The feedback signal is coupled to limit a maximum voltage of the LEDs and regulate the minimum voltage across the current sources.

13 Claims, 7 Drawing Sheets

HIGH EFFICIENCY LED DRIVER WITH CURRENT SOURCE REGULATIONS

CROSS-REFERENCE TO RELATED APPLICATION

This application claims the priority benefit of U.S. provisional application Ser. No. 61/278,070, filed on Oct. 1, 2009. The entirety of the above-mentioned patent application is hereby incorporated by reference herein and made a part of specification.

BACKGROUND OF THE INVENTION

1. Field of the Invention

The present invention relates to a LED (light emission diode) driver, and more particularly to a control circuit for LED lighting.

2. Description of Related Art

Figure 1:
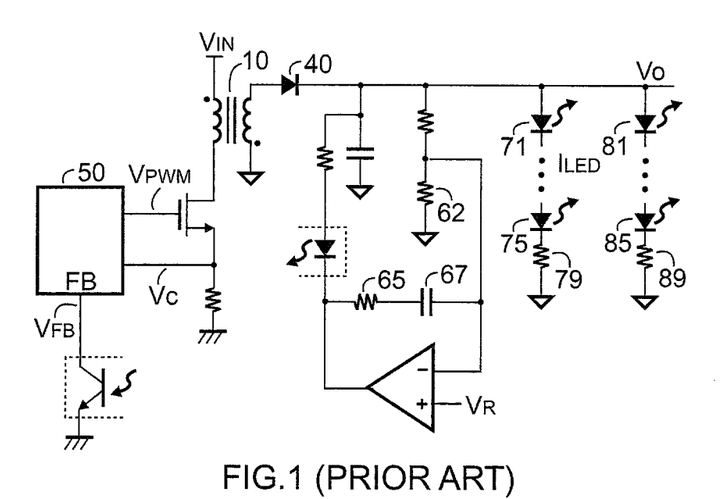
FIG. 1 shows a traditional LED driver.

The LED driver is utilized to control the brightness of LED in accordance with its characteristic. The LED driver is utilized to control the current that flow through the LED. A higher current will increase intensity of the bright, but decrease the life of the LED. FIG. 1 shows a traditional LED driver. The output voltage $V_O$ of the LED driver is adjusted to provide a current $I_{LED}$ through a resistor 79 to LEDs 71-75. The current $I_{LED}$ can be shown as, $$I_{LED} = \frac{V_O - V_{F71} - \ldots - V_{F75}}{R_{79}} \qquad (1)$$

wherein the $V_{F71}$-$V_{F75}$ are the forward voltage of the LEDs 71-75 respectively and $R_{79}$ is the resistance of the resistor 79.

The drawback of the LED driver shown in FIG. 1 is the variation of the current $I_{LED}$. The current $I_{LED}$ is changed in response to the change of the forward voltages of $V_{F71}$-$V_{F75}$. The forward voltages of $V_{F71}$-$V_{F75}$ are not constant due to the variation of production and operating temperature. Normally, the forward voltage of the LED is decreased in response to the increase of the operating temperature. The temperature coefficient of the LED forward voltage is around −2.5 mV/° C. If the LED is operated from −40° C. to +70° C., then the variation of the LED forward voltage will be around 0.275V. The LED current $I_{LED}$ is increased when the temperature is increased. If the resistor 79 is changed to a constant current source, the problem is still existed. For example, if 30 LEDs are connected in serial, the voltage drop at the current source would be greater than 8V when the temperature change from −40° C. to +70° C. It will cause a significant power loss and generate heat at the current source. The objective of the present invention is to develop a control circuit to regulate the LEDs current and the current source voltage for saving the power loss.

SUMMARY OF THE INVENTION

The present invention provides a LED driver. A voltage-feedback circuit is coupled to LEDs to sense a voltage-feedback signal for generating a voltage loop signal. Current sources are coupled to LEDs to control LED currents. A detection circuit is coupled to sense voltages of current sources for generating a current-source loop signal in response to a minimum voltage of current sources. A buffer circuit generates a feedback signal in accordance with the voltage loop signal and the current-source loop signal. The voltage-feedback signal is correlated to the maximum voltage across LEDs. The feedback signal is coupled to limit the maximum voltage of LEDs and maintain a minimum voltage across current sources.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 2:
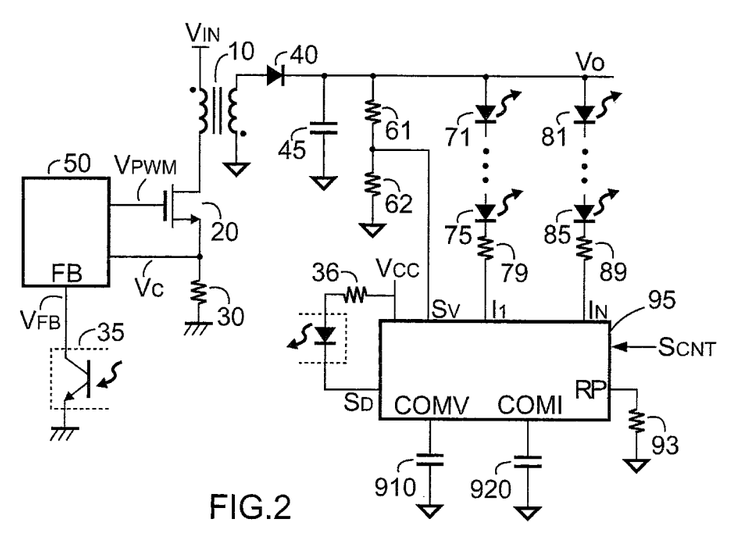
FIG. 2 is a preferred embodiment of a LED driver in accordance with the present invention.

FIG. 2 shows a preferred embodiment of a LED driver in accordance with present invention. LEDs 71-75 and 81-85 are connected to a controller 95. A voltage source $V_O$ is supplied to LEDs 71-75 and 81-85 through controller 95. LED currents flow into current sources $I_1$-$I_N$ of the controller 95. Resistors 61 and 62 form a voltage divider coupled to detect the voltage source $V_O$ and generate a voltage-feedback signal $S_V$. A detection circuit of the controller 95 is coupled to detect the voltage of current sources $I_1$-$I_N$ for generating current-source signals $S_1$-$S_N$. A feedback circuit 100 of the controller 95 is further coupled to receive current-source signals $S_1$-$S_N$ and the voltage-feedback signal $S_V$ (shown in FIG. 4) for generating a feedback signal $S_D$ to regulate LED currents and current sources $I_1$-$I_N$ voltages. A control terminal of the controller 95 receives a control signal $S_{CNT}$ for controlling the on/off of current sources $I_1$-$I_N$ and the intensity of LEDs. A resistor 93 is connected to the controller 95 through a RP terminal for determining the DC current of the current sources $I_1$-$I_N$ and LEDs.

A switching circuit including a switching controller 50 and a power transistor 20 generate LEDs current through a transformer 10. A rectifier 40 and a capacitor 45 are coupled to the transformer 10 to produce the voltage source $V_O$ in response to the switching of the transformer 10. The switching controller 50 generates a switching signal $V_{PWM}$ in accordance with a feedback voltage $V_{FB}$ and a switching current signal $V_C$. The feedback voltage $V_{FB}$ is produced by the feedback signal $S_D$ through an optical coupler 35. The switching signal $V_{PWM}$ is coupled to switch the transformer 10 through the power transistor 20. The pulse width of the switching signal $V_{PWM}$ determines the amplitude of the voltage source $V_O$. A resistor 30 is connected with the power transistor 20 to detect the switching current of the transformer 10 for generating the switching current signal $V_C$.

Figure 3:
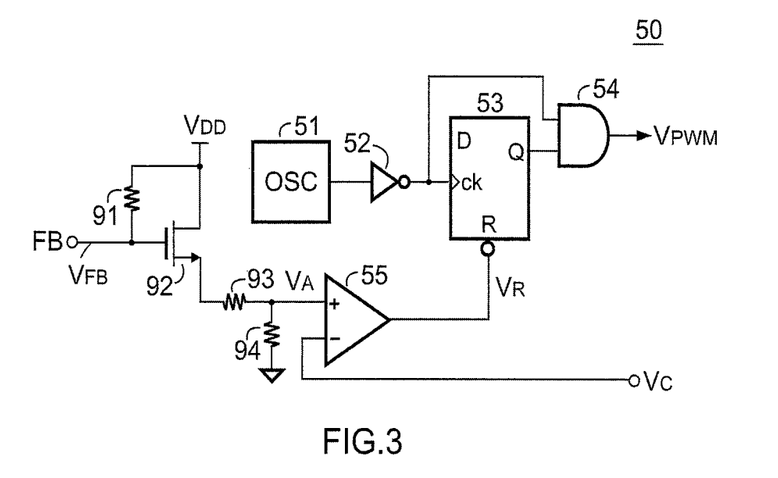
FIG. 3 shows an example circuit of a switching controller.

FIG. 3 shows a detail circuit of the switching controller 50. An oscillator 51 generates a pulse signal coupled to enable a flip-flop 53 via an inverter 52. The output of the flip-flop 53 and the output of the inverter 52 are connected to an AND gate 54 to enable the switching signal $V_{PWM}$. The feedback voltage $V_{FB}$ is connected to a level-shift transistor 92. A pull high resistor 91 is connected to the level-shift transistor 92 for the bias. Resistor 93 and 94 form a voltage divider further connected to the level-shift transistor 92 for generating an attenuation signal $V_A$. The attenuation signal $V_A$ is connected to an input of a comparator 55. Another input of the comparator 55 is connected to the switching current signal $V_C$. The attenuation signal $V_A$ compared with the switching current signal $V_C$ generates a reset signal $V_R$ coupled to disable the switching signal $V_{PWM}$ through the flip-flop 53.

Figure 4:
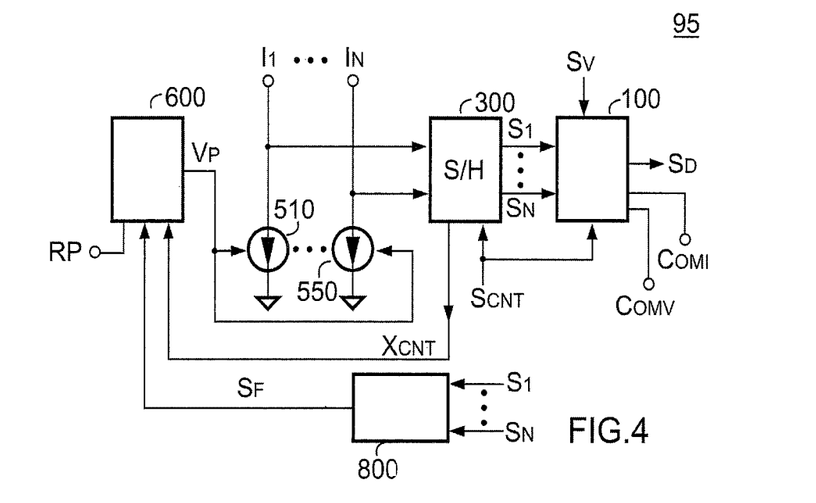
FIG. 4 is a preferred embodiment of a controller for the LED driver in accordance with the present invention.

FIG. 4 is a preferred circuit schematic of the controller 95. Current-source elements 510-550 are applied to generate current sources $I_1$-$I_N$. Current sources $I_1$-$I_N$ are coupled to LEDs to control LED currents. A reference signal generation circuit 600 is coupled to generate a reference signal $V_P$ in accordance with the resistor 93 (at RP terminal shown in FIG. 2). The reference signal $V_P$ is coupled to current-source elements 510-550 to determine the LED currents. A control signal (first control signal) $X_{CNT}$ is coupled to control the on/off of the current-source elements 510-550 through the control of the reference signal $V_P$ generated from the reference signal generation circuit 600. The control signal $X_{CNT}$ is generated by a control signal (second control signal) $S_{CNT}$ through a sample-and-hold circuit 300. A detection circuit includes the sample-and-hold circuit 300 and amplifiers. Amplifiers are developed in a feedback circuit 100. The sample-and-hold circuit 300 is coupled to sense voltages of current sources $I_1$-$I_N$ for generating current-source signals $S_1$-$S_N$. Current-source signals $S_1$-$S_N$ are further connected to amplifiers of the feedback circuit 100 for generating a current-source loop signal $C_{OMI}$ in response to a minimum voltage of current sources $I_1$-$I_N$. A voltage-feedback circuit inside the feedback circuit 100 is coupled to sense the voltage-feedback signal $S_V$ (shown in FIG. 2) to generate a voltage loop signal $C_{OMV}$. A buffer circuit of the feedback circuit 100 generates the feedback signal $S_D$ in accordance with the voltage loop signal $C_{OMV}$ and the current-source loop signal $C_{OMI}$. Through the control of the voltage source $V_O$, the feedback signal $S_D$ is coupled to limit the maximum voltage of LEDs and control the minimum voltage across current sources $I_1$-$I_N$. A protection circuit 800 is utilized to detect current-source signals $S_1$-$S_N$. If the value of the current-source signals $S_1$-$S_N$ over an over-voltage threshold $V_{T2}$ (shown in FIG. 12), then a fault signal $S_F$ will be generated to turn off the reference signal $V_P$ for protecting the current-sources elements 510-550 from the overheat.

Figure 5:
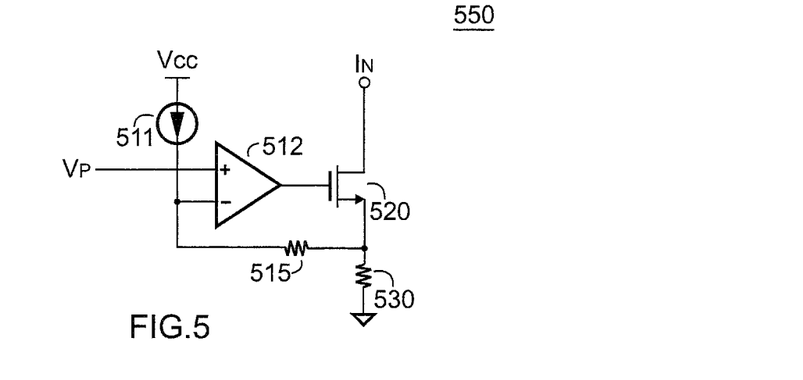
FIG. 5 shows the circuit schematic of a current source for a LED driver in accordance with the present invention.

FIG. 5 shows a preferred circuit of the current-source element 510-550. Since every current-source element 510-550 are the same, the current-source element 550 will be shown just as an reference. An operational amplifier 512 is coupled to receive the reference signal $V_P$. The operational amplifier 512, a transistor 520 and a resistor 530 develop a voltage-to-current converter to generate the current source $I_N$ according to the reference signal $V_P$. A current source 511 and a resistor 515 generate a DC bias voltage that is used for calibrating the offset voltage of the operational amplifier 512. So, the current source $I_N$ is generated once the voltage of the reference signal $V_P$ is larger than the bias voltage.

Figure 6:
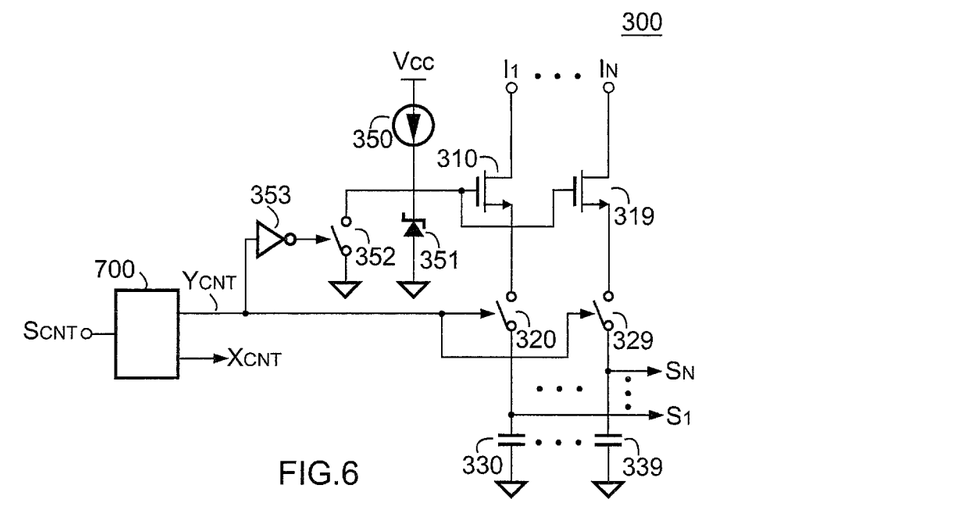
FIG. 6 is a sample-and-hold circuit of the controller in accordance with the present invention.

FIG. 6 shows the circuit schematic of the sample-and-hold circuit 300. Voltage-clamp transistors 310-319 are coupled to current sources $I_1$-$I_N$ for clamping the voltage of the current sources $I_1$-$I_N$ under a maximum value. The output (source terminal) of the voltage-clamp transistors 310-319 are coupled to sample-switches 320-329 in series for sampling the voltage of current sources $I_1$-$I_N$. Hold-capacitors 330-339 are coupled to the sample-switches 320-329 for generating the current-source signals $S_1$-$S_N$. A signal generation circuit 700 generates a control signal (third control signal) $Y_{CNT}$ and the control signal $X_{CNT}$ in response to the control signal $S_{CNT}$. The control signal $Y_{CNT}$ is coupled to control the sample-switches 320-329. A threshold voltage generated by a zener diode 351 is connected to the gate of voltage-clamp transistors 310-319. A current source 350 provides a bias to the zener diode 351. A switch 352 is connected from the gate of the voltage-clamp transistors 310-319 to the ground. The switch 352 is controlled by the control signal $Y_{CNT}$ through an inverter 353. Therefore, the voltage-clamp transistors 310-319 can be turned off in response to the control signal $Y_{CNT}$.

Figure 7:
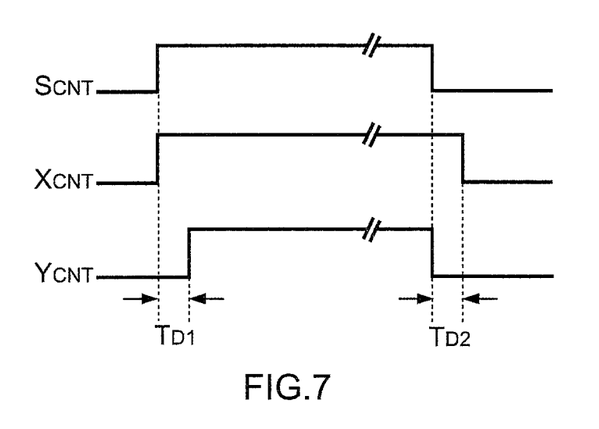
FIG. 7 is signal waveforms of the sample-and-hold circuit.
Figure 8:
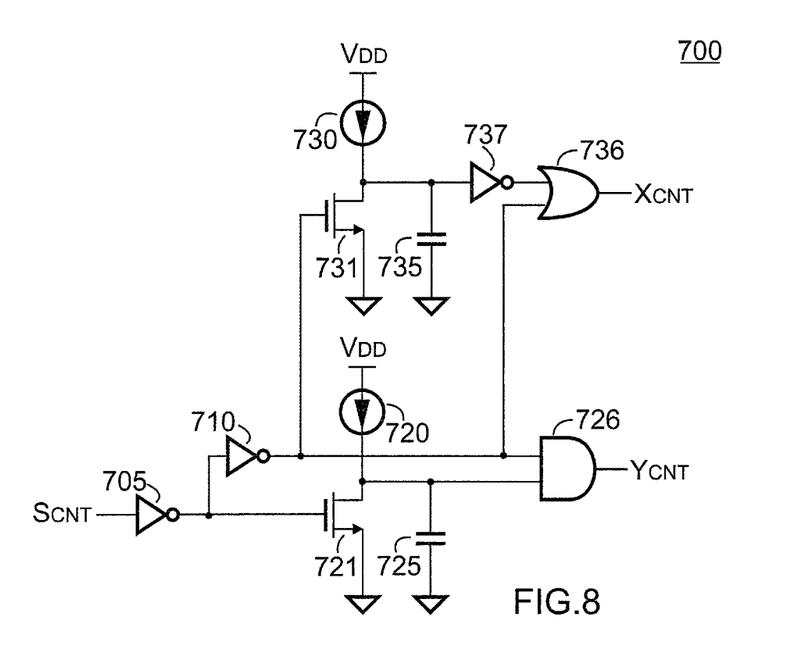
FIG. 8 is a preferred embodiment of a signal generation circuit.

FIG. 7 shows signal waveforms of the sample-and-hold circuit 300. Delay times $T_{D1}$ and $T_{D2}$ are inserted in between the control signals $S_{CNT}$, $X_{CNT}$ and $Y_{CNT}$. FIG. 8 shows a preferred embodiment of the signal generation circuit 700. A current source 720 and the capacitance of a capacitor 725 determine the delay time $T_{D1}$. A current source 730 and the capacitance of a capacitor 735 determine the delay time $T_{D2}$. The control signal $S_{CNT}$ is connected to control a transistor 721 via an inverter 705. The transistor 721 is coupled to discharge the capacitor 725. The control signal $S_{CNT}$ is further coupled to control a transistor 731 through inverters 710 and 705. A transistor 731 is coupled to discharge the capacitor 735. An OR gate 736 generates the control signal $X_{CNT}$. The input of OR gate 736 is coupled to the capacitor 735 via an inverter 737. Another input of OR gate 736 is connected to the output of the inverter 710. An AND gate 726 generates the control signal $Y_{CNT}$. The input of the AND gate 726 is connected to the capacitor 725. Another input of the AND gate 726 is connected to the output of the inverter 710.

Figure 9:
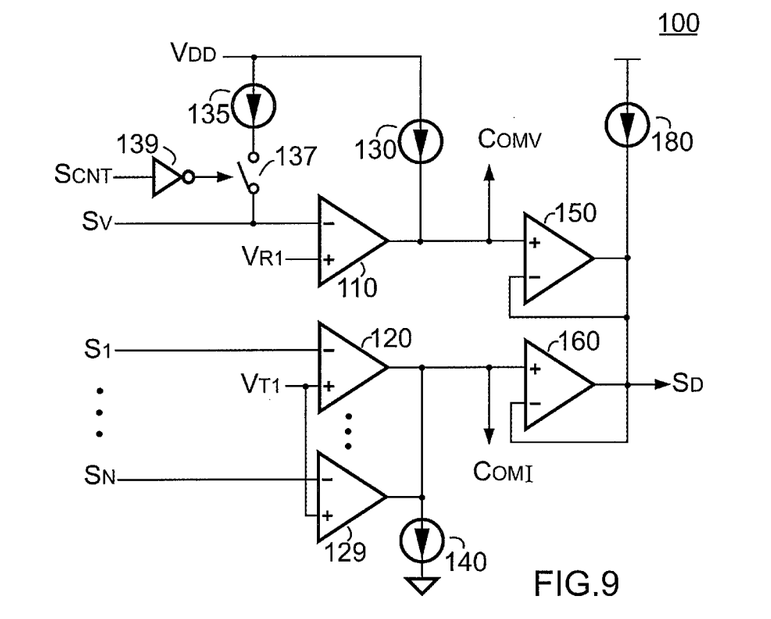
FIG. 9 shows a feedback circuit of the controller in accordance with the present invention.
Figure 10A:
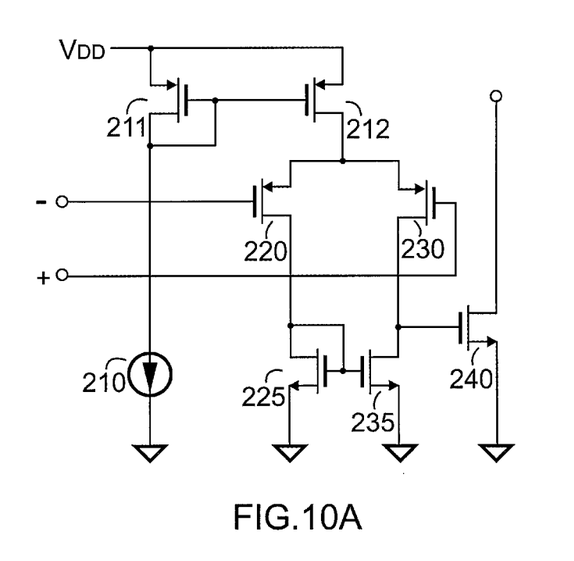
FIGS. 10A and 10B are circuit schematics of trans-conductance operational amplifiers.

FIG. 9 shows the feedback circuit 100. The voltage-feedback circuit of the feedback circuit 100 includes an operational amplifier 110 and a current source 130. The operational amplifier 110 has a reference voltage $V_{R1}$ compared with the voltage-feedback signal $S_V$ to generate the voltage loop signal $C_{OMV}$. A capacitor 910 (shown in FIG. 2) is coupled from the output of the operational amplifier 110 to the ground for the frequency compensation. The operational amplifier 110 is a trans-conductance operational amplifier that is shown in FIG. 10A.

Amplifiers of the detection circuit include operational amplifiers 120-129 and a current source 140. The positive input of each of the operational amplifiers 120-129 has a minimum-voltage threshold $V_{T1}$. The negative input of each of the operational amplifiers 120-129 is coupled to sense current-source signals $S_1$-$S_N$ respectively. Amplifiers 120-129 will generate the current-source loop signal $C_{OMI}$ in response the minimum voltage of current sources $I_1$-$I_N$. A capacitor 920 is coupled from outputs of the operational amplifiers 120-129 to the ground for the loop compensation. The operational amplifiers 120-129 are trans-conductance amplifier (shown in FIG. 10B) and connected in parallel.

The buffer circuit of the feedback circuit 100 including operational amplifiers 150, 160 (shown in FIG. 10A) and a current source 180 generate a feedback signal $S_D$ in accordance with the voltage loop signal $C_{OMV}$ and the current-source loop signal $C_{OMI}$. The buffer amplifier 150 and the buffer amplifier 160 are connected in parallel for generating the feedback signal $S_D$. The feedback signal $S_D$ is coupled to the switching circuit 50 through the optical-coupler 35 for limiting the maximum voltage of LEDs and regulating the minimum voltage of the current-sources elements 510-550.

A current source 135 is coupled to the voltage-feedback signal $S_V$ through a switch 137. The control signal $S_{CNT}$ is coupled to control the switch 137 through an inverter 139. Therefore, a control current is generated in response to the control signal $S_{CNT}$. The value of the control current is determined by the current source 135. The control current is coupled to the voltage divider to limit the output voltage $V_O$ across LEDs, $$V_O = \frac{R_{61} + R_{62}}{R_{62}} \times V_{R1} \qquad (1)$$

$$V_O = \frac{R_{61} + R_{62}}{R_{62}} \times \left(V_{R1} - I_{135} \times \frac{R_{61} \times R_{62}}{R_{61} + R_{62}}\right) \qquad (2)$$

where $R_{61}$ and $R_{62}$ are the resistance of resistors 61 and 62 (shown in FIG. 2) respectively; $I_{135}$ is the current of the current source 135. Equation (1) shows the maximum voltage across LEDs when the switch 137 is off. Equation (2) shows the maximum voltage across LEDs once the switch 135 is on. The maximum value of LEDs voltage can be programmed by the ratio and the value of the resistance of the resistors 61 and 62.

FIG. 10A shows an example circuit for the trans-conductance operational amplifiers 110, 150 and 160. Referring to FIG. 10A, the example circuit of the trans-conductance operational amplifier includes transistors 211, 212, 220, 225, 230, 235 and 240, and a current source 210. The transistors 211 and 212 develop a current mirror and are coupled to a voltage source $V_{DD}$, and gates of the transistors 211 and 212 are connected. A drain of the transistor 211 is connected to the gate thereof and coupled to the ground via the current source 210. A drain of the transistor 212 is coupled to the transistors 220 and 230. The transistors 220 and 230 develop a differential pair, and a gate of the transistor 220 is coupled to an inverting input terminal of the trans-conductance operational amplifier. A gate of the transistor 220 is coupled to a non-inverting input terminal of the trans-conductance operational amplifier. The transistor 220 is coupled to the ground via the transistor 225. The transistor 230 is coupled to the ground via the transistor 235. The transistors 225 and 235 develop another current mirror. A gate of the transistor 225 is connected to a drain of the transistor 225 and a gate of the transistor 235. A drain of the transistor 235 is coupled to a gate of the transistor 240. A drain of the transistor 240 is coupled to an output terminal of the trans-conductance operational amplifier.

Figure 10B:
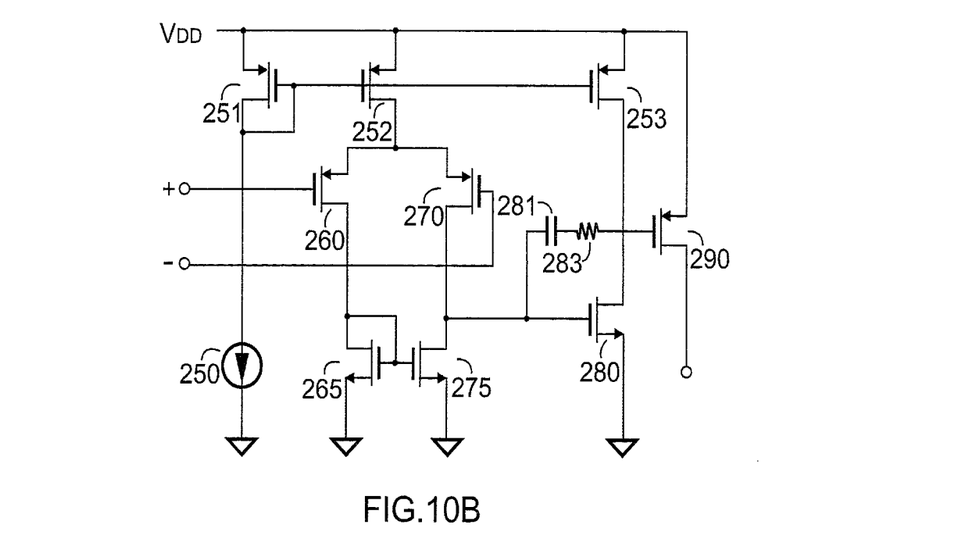

FIG. 10B shows another example circuit for the trans-conductance amplifiers 120-129. Referring to FIG. 10B, the another example circuit for the trans-conductance amplifier includes a transistors 251, 252, 253, 260, 265, 270, 275, 280 and 290, a current source 250, a capacitor 281 and a resistor 283. The transistors 251, 252 and 253 develop a current mirror. The transistors 251, 252 and 253 are coupled to the voltage source $V_{DD}$, and gates of the transistors 251, 252 and 253 are connected. A drain of the transistor 251 is connected to the gate thereof and coupled to the ground via the current source 250. A drain of the transistor 252 is coupled to the transistors 260 and 270. The transistors 260 and 270 develop a differential pair, and a gate of the transistor 260 is coupled to the non-inverting input terminal of the trans-conductance operational amplifier. A gate of the transistor 270 is coupled to the inverting input terminal of the trans-conductance operational amplifier. The transistor 260 is coupled to the ground via the transistor 265. The transistor 270 is coupled to the ground via the transistor 275. The transistors 265 and 275 develop another current mirror. A gate of the transistor 265 is connected to a drain of the transistor 265 and a gate of the transistor 275. A drain of the transistor 275 is coupled to a gate of the transistor 280 and also coupled to a gate of the transistor 290 via the capacitor 281 and the resistor 283. A drain of the transistor 280 is coupled to a drain of the transistor 253. A source of the transistor 290 is coupled to the voltage source $V_{DD}$, and a drain of the transistor 290 is coupled to an output terminal of the trans-conductance operational amplifier.

Figure 11:
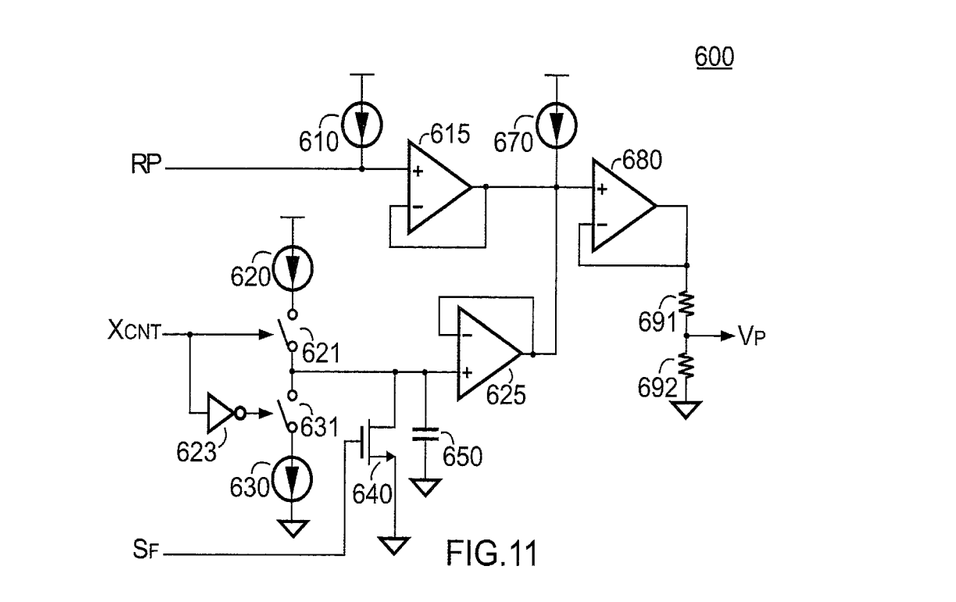
FIG. 11 is a preferred embodiment of a reference signal generation circuit in accordance with the present invention.

FIG. 11 is the reference signal generation circuit 600. A current source 610 is connected to the RP terminal to generate a signal coupled to an operational amplifier 615. Current sources 620, 630, switches 621, 631 and an inverter 623 form a charge-and-discharge circuit coupled to charge and discharge a capacitor 650 for determining the rising time and the falling time of the reference signal $V_P$ in response to the on/off of the control signal $X_{CNT}$. A transistor 640 is coupled to discharge the capacitor 650 when the fault signal $S_F$ is enabled. The capacitor 650 is connected to another operational amplifier 625. The operational amplifiers 615 and 625 (shown in FIG. 10A) are connected in parallel, and a current source 670 is used for the pull-high. The outputs of the operational amplifiers 615 and 625 are connected to a buffer amplifier 680. The reference signal $V_P$ is generated at the output of the buffer amplifier 680 through an attenuator developed by resistors 691 and 692.

Figure 12:
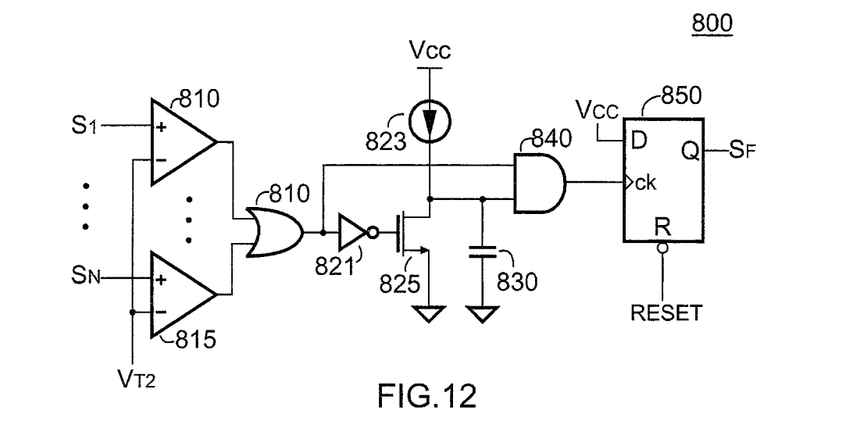
FIG. 12 is a preferred embodiment of a protection circuit in accordance with the present invention.

FIG. 12 is the protection circuit 800. Comparators 810-815 are coupled to receive current-source signals $S_1$-$S_N$. Another input of the comparators 810-815 are connected by the over-voltage threshold $V_{T2}$. A current source 823, an inverter 821, a transistor 825, an AND gate 840 and a capacitor 830 form a debounce circuit. Via an OR gate 820 and the debounce circuit, the outputs of comparators 810-815 are coupled to trig a flip-flop 850 when the value of the current-source signals $S_1$-$S_N$ is higher than the over-voltage threshold $V_{T2}$. The flip-flop 850 will generate the fault signal $S_F$ to turn off the reference signal $V_P$ (shown in FIG. 4) and protect the current-sources elements 510-550.

While the present invention has been particularly shown and described with reference to preferred embodiments thereof, it will be understood by those of ordinary skill in the art that various changes in form and details may be made therein without departing from the spirit and scope of the present invention as defined by the appended claims.

Although the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:
1. A controller for LED driver comprising:
a voltage-feedback circuit coupled to LEDs to sense a voltage-feedback signal for generating a voltage loop signal;
current sources coupled to the LEDs to control LED currents;

a detection circuit coupled to sense voltages of the current sources for generating a current-source loop signal in response to a minimum voltage of the current sources, wherein the detection circuit comprises:
  a sample-and-hold circuit coupled to sense the voltages of the current sources and generating current-source signals; and
  amplifiers receiving the current-source signals to generate the current-source loop signal;
  wherein the amplifiers are connected in parallel; the current-source loop signal is generated in response to the minimum voltage of the current-source signals; and
a buffer circuit generating a feedback signal in accordance with the voltage loop signal and the current-source loop signal;
wherein the voltage-feedback signal is correlated to a maximum supply voltage to the LEDs; the feedback signal is coupled to limit the maximum voltage of the LEDs and control the minimum voltage across the current sources.

2. The controller for LED driver as claimed in claim 1, in which the feedback signal is coupled to a switching controller; the switching controller generates a supply voltage to the LEDs.

3. The controller for LED driver as claimed in claim 1, in which the voltage-feedback circuit has a reference voltage compared with the voltage-feedback signal to generate the voltage loop signal; the detection circuit has a threshold compared with the voltages of the current sources to generate the current-source loop signal.

4. The controller for LED driver as claimed in claim 1, further comprising:
  a control terminal coupled to receive a control signal for controlling an intensity of the LEDs; wherein a control current is generated in response to the control signal.

5. The controller for LED driver as claimed in claim 1, in which the voltage-feedback circuit comprising:
  a first operational amplifier coupled to receive the voltage-feedback signal for generating the voltage loop signal; and
  a first capacitor coupled from an output of the first operational amplifier to a ground for a frequency compensation.

6. The controller for LED driver as claimed in claim 1, in which the buffer circuit comprising:
  a first buffer amplifier coupled to receive the voltage loop signal; and
  a second buffer amplifier coupled to receive the current-source loop signal;
  wherein the first buffer amplifier and the second buffer amplifier are connected in parallel for generating the feedback signal.

7. The controller for LED driver as claimed in claim 1, in which the sample-and-hold circuit comprising:
  voltage-clamp transistors coupled to the current sources for clamping the voltage of current sources under a maximum value;
  sample-switches connected with voltage-clamp transistors in series to sample the voltages of the current sources; and
  hold-capacitors coupled to the sample-switches for generating current-source signals;
  wherein a threshold voltage is connected to gates of the voltage-clamp transistors.

8. A LED driver comprising:
current sources coupled to LEDs to control LED currents;
a detection circuit coupled to sense voltages of the current sources for generating a current-source loop signal in response to a minimum voltage of the current sources, wherein the detection circuit comprises:
  a sample-and-hold circuit coupled to sense the voltages of the current sources for generating current-source signals; and
  amplifiers receiving the current-source signals to generate the current-source loop signal;
  wherein the amplifiers are connected in parallel; the current-source loop signal is generated in response to the minimum voltage of the current-source signals; and
a buffer circuit generating a feedback signal in accordance with the current-source loop signal;
wherein the feedback signal is coupled to control the minimum voltage across the current sources.

9. The LED driver as claimed in claim 8, in which the feedback signal is coupled to a switching controller; the switching controller generates the LED currents.

10. The LED driver as claimed in claim 8, in which the detection circuit has a threshold compared with the voltages of current sources to generate the current-source loop signal.

11. The LED driver as claimed in claim 8, in which the sample-and-hold circuit comprising:
  voltage-clamp transistors coupled to the current sources for clamping the voltage of the current sources under a maximum value;
  sample-switches connected with the voltage-clamp transistors in series to sample the voltage of the current sources; and
  hold-capacitors coupled to the sample-switches for generating the current-source signals;
  wherein a threshold voltage is connected to gates of voltage-clamp transistors.

12. The LED driver as claimed in claim 8, further comprising:
  a reference signal generation circuit generating a reference signal coupled to the current sources to determine the LED currents; a control signal is coupled to turn on or turn off the reference signal; wherein a rising time and a falling time of the reference signal is determined by a charge-and-discharge circuit.

13. The LED driver as claimed in claim 8, further comprising: a protection circuit generating a fault signal to turn off the LED currents; wherein the fault signal will be generated once the current source voltage is higher than an over-voltage threshold.

* * * * *